United States Patent [19]
Ichino et al.

[11] Patent Number: 5,805,353
[45] Date of Patent: Sep. 8, 1998

[54] OPTICAL SYSTEM MOVING DEVICE

[75] Inventors: Kazushige Ichino; Kiyoshi Tachibana, both of Tokyo, Japan

[73] Assignee: Canon Kabushiki Kaisha, Tokyo, Japan

[21] Appl. No.: 726,621

[22] Filed: Oct. 7, 1996

Related U.S. Application Data

[63] Continuation of Ser. No. 170,428, Dec. 20, 1993, abandoned.

[30] Foreign Application Priority Data

Dec. 25, 1992 [JP] Japan ................................. 4-346716
Dec. 28, 1992 [JP] Japan ................................. 4-347818

[51] Int. Cl.⁶ ............................. G02B 15/14; G02B 7/02
[52] U.S. Cl. ............................... 359/699; 359/826
[58] Field of Search ................... 359/699, 694, 359/700, 701, 704, 705, 822, 823, 826

[56] References Cited

U.S. PATENT DOCUMENTS

| | | | |
|---|---|---|---|
| 3,610,733 | 10/1971 | Back | 359/700 |
| 3,897,998 | 8/1975 | Someya | 359/700 |
| 4,322,151 | 3/1982 | Weiss | 354/196 |
| 4,465,344 | 8/1984 | Sumi | 359/699 |
| 4,585,429 | 4/1986 | Marier | 474/12 |
| 4,704,083 | 11/1987 | Iizuka | 359/699 |
| 4,707,083 | 11/1987 | Iizuka | 359/700 |
| 4,767,200 | 8/1988 | Inaba et al. | 357/699 |
| 4,974,949 | 12/1990 | Tanaka | 359/694 |
| 4,989,950 | 2/1991 | Nakauchi | 359/818 |
| 5,216,549 | 6/1993 | Notagashira | 359/703 |
| 5,225,938 | 7/1993 | Nomura | 359/699 |
| 5,373,397 | 12/1994 | Satoh | 359/699 |
| 5,586,467 | 12/1996 | Weber | 74/57 |

FOREIGN PATENT DOCUMENTS

| | | | |
|---|---|---|---|
| 58-100805 | 6/1983 | Japan . | |
| 1-133014 A | 5/1989 | Japan | 359/699 |
| 260408 | 10/1989 | Japan | 359/699 |
| 144410 | 6/1991 | Japan | 359/704 |

*Primary Examiner*—David C. Nelms
*Assistant Examiner*—Ricky Mack
*Attorney, Agent, or Firm*—Robin, Blecker & Daley

[57] ABSTRACT

An optical member moving device includes an optical member, a cam member, a cam follower arranged to move the optical member according to the guidance of the cam member, and an elastic member arranged at the cam follower to bias the position of the cam follower to the cam member by urging the cam follower in the direction of movement of the optical member. The optical member moving device can also include an optical member, a holding member arranged to hold the optical member, a driving force transmitting part arranged to move the holding member while causing the holding member to rotate, and a guide part which is arranged to receive a force from the holding member and is fixedly disposed in part on one side of an optical axis opposite to another side on which the driving force transmitting part is located across the optical axis.

48 Claims, 20 Drawing Sheets

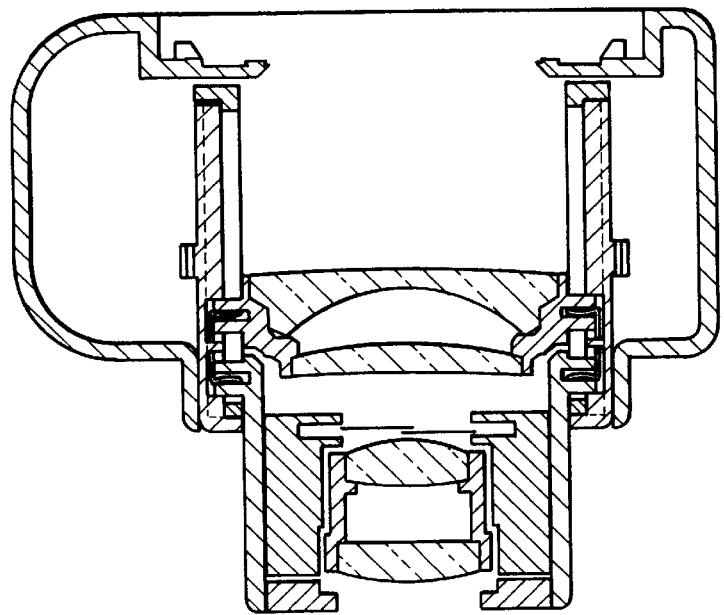
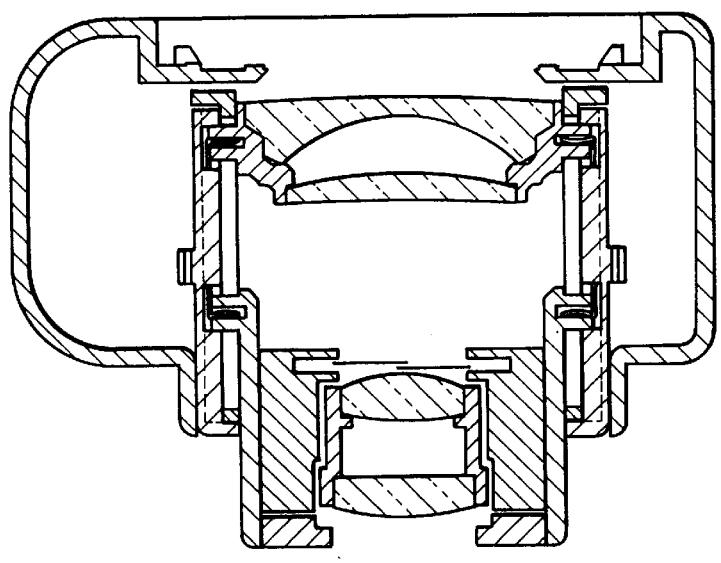
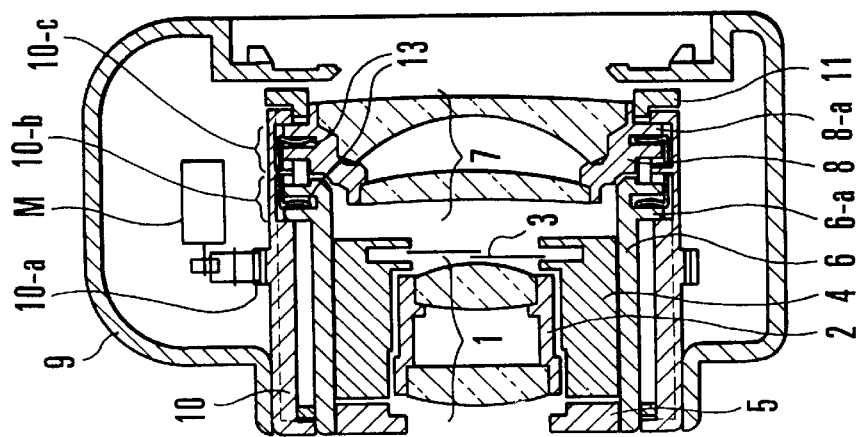

FIG.4(a) FIG.4(c)
FIG.4(b)
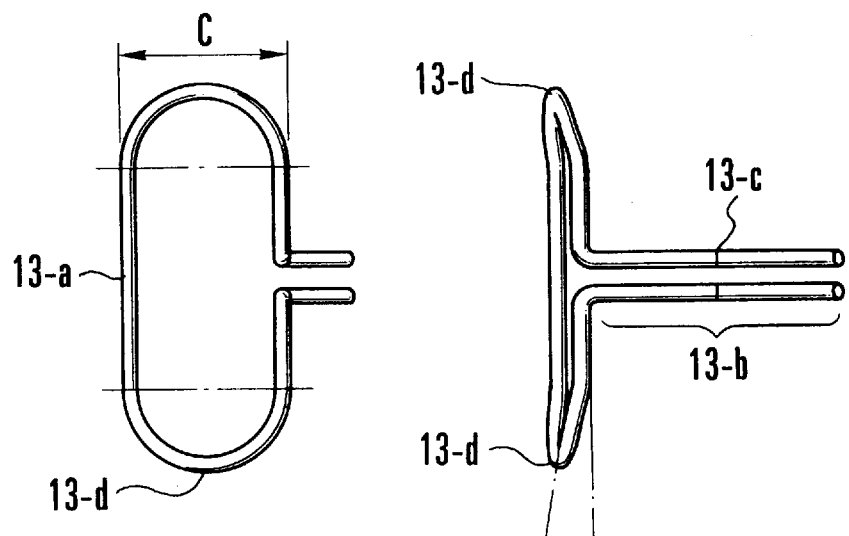
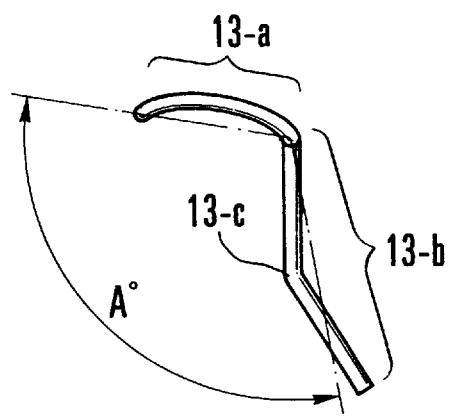

BARREL-RETRACTED POSITION

WIDE-ANGLE END POSITION

TELEPHOTO END POSITION

OPTICAL SYSTEM MOVING DEVICE

This is a continuation application under 37 CFR 1.62 of prior application Ser. No. 08/170,428, filed Dec. 20, 1993 now abandoned.

BACKGROUND OF THE INVENTION

1. Field of the Invention

This invention relates to an optical system moving device for an optical apparatus such as a camera or a lens barrel or the like.

2. Description of the Related Art

Zoom type compact cameras are generally arranged to enhance their portability by arranging a lens barrel to be retracted (contracted) further than its wide-angle end position into a sunken (stowed) state from a zoom shooting area obtained by drawing out the lens barrel from a wide-angle end position to a telephoto end position. In most cases, a cam mechanism is used for drawing a lens group, employed as an optical system, out and into a camera body in zooming and bringing the lens barrel to a stowed state into the camera body. An inner cam tube which has a cam groove formed with a bottom only in the inner side thereof has come to be often employed of late as the cam mechanism. Compared with an outer cam tube which has a cam slot formed by piercing the cam tube using the whole thickness of it, the inner cam tube excels in rigidity and the width of its cam groove is not easily changed by an external force. The conventional arrangement is shown by way of example in FIGS. 17(a), 17(b) and 17(c).

FIGS. 17(a), 17(b) and 17(c) are sectional views conceptually showing the mechanism of an ordinary two-group type zoom lens barrel. A first lens group 101 and a second lens group 102 are secured respectively to a first lens group frame 103 and a second lens group frame 104. Cam pins 103-a and 104-a which are planted in these lens group frames 103 and 104 are arranged to be movable in the direction of an optical axis by a combination of a rectilinear moving frame 105 and a cam tube 106. With the cam pins 103-a and 104-a thus moved, the lens barrel is drawn out while varying a distance between the lens groups 101 and 102. The cam tube 106 is provided with inner cam grooves 106-c and 106-d which are arranged along the inner circumferential side of the cam tube 106 to optically guide the first and second lens group cam pins 103-a and 104-a. A gear 106-a is arranged on the outer circumferential side of the cam tube 106 to transmit a rotatory driving force. The lens barrel is shown in a barrel retracted (sunken) position in FIG. 17(a), in a wide-angle end position in FIG. 17(b) and as in a telephoto end position in FIG. 17(c).

FIG. 18 is an enlarged view showing the cam pin part of the lens barrel. Referring to FIG. 18, an inter-lens spring 107 is arranged to urge the first and second lens group frames 103 and 104 in the directions of widening a space between them within the lens barrel for the purpose of removing any play or backlash between each of the cam pins 103-a and 104-a and each of the inner cam grooves 106-c and 106-d (to leave no gap between the cam pin and the cam groove). The spring 107 thus removes any play (backlash) by causing the first lens group frame cam pin 103-a to abut on a face cam 106-e and the second lens group frame cam pin 104-a to abut on a face cam 106-f. The term "face cam" as used herein means a cam having its cam face arranged perpendicular to the optical axis.

Another example of the conventional arrangement is shown in FIG. 20, which is an enlarged view showing only the essential part of the example. In this case, the above-stated inter-lens spring 107 is replaced with a combination of a taper pin 108 and a taper pin spring 109. A hole 103-b is formed in a part of the lens group frame 103 corresponding to the position of the cam pin 103-a. The taper pin 108 which has a tapered face at its fore end is slidably fitted into the hole 103-b. The taper pin spring 109 is inserted and arranged in such a way as to constantly urge the taper pin 108 in the direction of springing out. The spring 109 is in the form of a wave washer. However the spring 109 may be in the form of a coiled spring. The inner cam groove of the cam tube 106 is arranged to have a tapered inner cam face 106-g conform to the tapered face 108-a of the taper pin 108. This arrangement enables the lens group frame 103 to stably slide and move along the inner cam groove without any rattling within the cam tube 106.

FIG. 21 shows a further example of the conventional arrangement disclosed in Japanese Utility Model Publication No. SHO 48-44975. In that case, each of the cam pins 103-a and 104-a is covered with a cap-shaped member 110 which is made of a synthetic resin of a small coefficient of friction and formed in a size larger than the width of the cam groove 106-c or 106-d by about several $\mu$ to 0.3 mm. With the cap-shaped members 110 fitted on the outer sides of the cam pins 103-a and 104-a, the lens group frames 103 and 104 can be stably slid and moved without rattling within the cam grooves 106-c and 106-d.

However, according to the arrangement which is shown in FIGS. 17(a), 17(b), 17(c) and 18, the use of the inter-lens spring causes an increase in a driving force necessary in carrying out an action of retracting and stowing the lens barrel into the camera body. Meanwhile, in the case of FIG. 20, the use of the taper pins causes an increase in the number of necessary parts.

Reasons for the increase in the driving force resulting from the use of the inter-lens spring are first described in detail as follows: FIG. 19 is a development view showing a part of the cam tube 106 having the inner cam grooves 103-a and 104-a arranged to bring the lens barrel to the retracted position, the wide-angle end position and the telephoto end position as shown in FIGS. 17(a), 17(b) and 17(c). In FIG. 19, cam curves provided within a section 106-e for satisfactorily carrying out optical functions between the wide-angle end position and the telephoto end position of the lens barrel are shown by straight lines for the sake of simplification of the illustration. A part where the spring force of the inter-lens spring 107 is necessary for removal of the play is the section 106-e between the wide-angle end position and the telephoto end position. This spring force is, on the other hand, not required for a barrel retracting section 106-f. However, since it is difficult to cancel the urging force of the inter-lens spring 107 halfway, the spring must be left in about the same compressed state as in the state obtained at the telephoto end position even after the retracted state of the lens barrel is obtained. Further, if the interval of the section 106-e between the wide-angle end and the telephoto end positions is widened for the purpose of increasing the controllability of the process of drawing out the lens group frames in relation to the rotation of the cam tube 106, the barrel retracting section 106-f inevitably becomes shorter accordingly. Such arrangement would cause the first lens group frame 103 to suddenly move from its wide-angle end position to its barrel retracted position. The angle (F degrees) of the cam then increases to cause a driving force required in compressing the inter-lens spring 107 within the section 106-f to become larger than a normal driving force required for the section 106-e between the wide-angle and telephoto end positions. Therefore, it is necessary to use an unnecessarily great force of a motor or the like, which inefficiently consumes a battery.

The problem of this example of the conventional arrangement mentioned above can be solved by the example shown in FIG. 20. However, according to the arrangement of that example, two parts are necessary for each of the cam pins and, hence, six parts are necessary for three cam pins which have heretofore been considered to be necessary for one lens group. In the case of a two-group type zoom lens, therefore, the arrangement necessitates the use of a total of 12 parts, which are too many.

Further, in the case of the example shown in FIG. 21, the cam pins 103-*a* and 104-*a* are left in a buoyed state within the cam grooves 106-*c* and 106-*d* because of the extent of elastic deformation of the synthetic resin members 110. Although it leaves no play, the buoyed state does not ensure the movement of the cam pins in conformity with the desired loci defined by the cam curves. This is because the synthetic resin members 110 do not always uniformly deform and thus tend to bring about some error.

FIG. 22 shows a camera arranged to transmit the force of a motor or the like to a driving shaft 201 and to move a lens barrel 203 back and forth in the direction of an optical axis by transmitting the rotation of the driving shaft to a helicoid mechanism or the like. In the case of the camera of this kind, any rotation relative to the direction of the optical axis is suppressed by moving the lens barrel 203 along its optical axis. In the case of that example of the conventional camera, however, an external force, such as a static pressure, shaking or collision, on the lens barrel 203 is sustained solely by a part where the lens barrel 203 fittingly engages the driving shaft 201. Hence, the lens barrel 203 might be bent, for example as shown in FIG. 23, to bring forth an adverse effect on the optical performance of the camera.

SUMMARY OF THE INVENTION

This invention is directed to the solution of the problems of the prior art described in the foregoing. It is, therefore, a principal object of this invention to provide an optical system moving device which is capable of accurately and adequately moving the optical system of an optical apparatus such as a camera or a lens barrel, or the like, despite its simple structural arrangement.

To attain the object, one aspect of this invention lies in that an optical system moving device according to this invention includes an optical member, a cam member, a cam follower arranged to cause the optical member to move while being guided by the cam member, and an elastic member arranged at the cam follower to bias the position of the cam follower to the cam member by urging the cam follower in the direction of movement of the optical member.

Another aspect of this invention lies in that an optical system moving device according to this invention includes an optical member, a holding member arranged to hold the optical member, a driving force transmitting part arranged to move the holding member while causing the holding member to rotate, and a fixed guide part arranged to receive a force from the holding member and disposed in part on one side of an optical axis opposite to another side on which the driving force transmitting part is located across the optical axis.

The above and other aspects and features of this invention will become apparent from the following detailed description of embodiments thereof taken in connection with the accompanying drawings.

BRIEF DESCRIPTION OF THE DRAWINGS

FIGS. 1(*a*), 1(*b*) and 1(*c*) are sectional views showing essential parts of a first embodiment of this invention.

FIGS. 4(*a*), 4(*b*) and 4(*c*) show the shape of the biasing spring of the first embodiment of this invention.

DETAILED DESCRIPTION OF THE PREFERRED EMBODIMENTS

Figure 2:
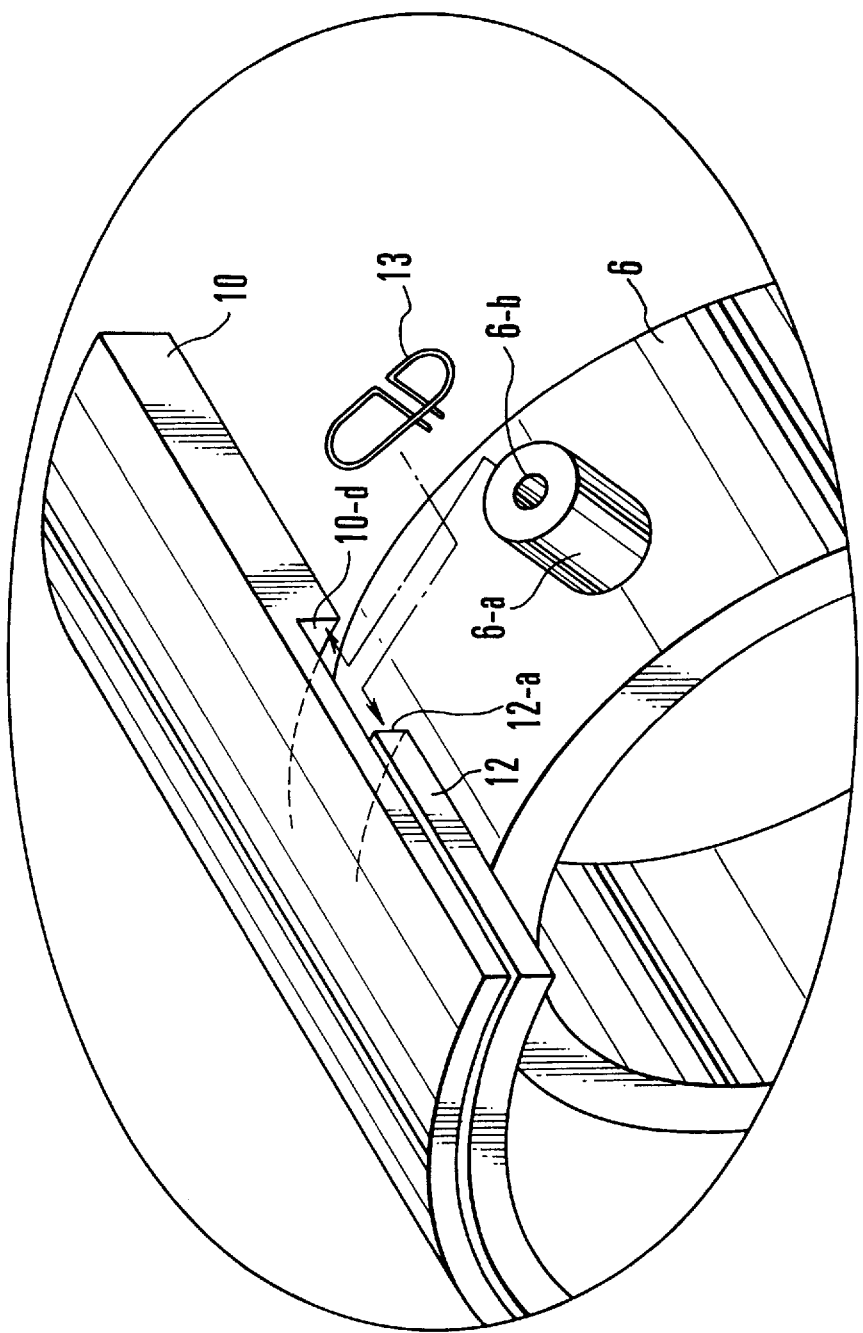
FIG. 2 is an oblique view conceptually showing the first embodiment of this invention.

Some embodiments of this invention are described with reference to the accompanying drawings as follows:

FIGS. 1(*a*), 1(*b*) and 1(*c*) to FIGS. 6(*a*) and 6(*b*) show a first embodiment of this invention. FIG. 2 is an oblique view showing the concept of the first embodiment and FIGS. 1(a), 1(b) and 1(c) are sectional views showing the essential parts of the embodiment.

Referring to FIGS. 1(a), 1(b) and 1(c), a first lens group 1 is secured to a first lens group holder 2. The first lens group holder 2 and shutter blades 3 which serve also as a diaphragm are disposed within a driving mechanism 4 which is shown in a simplified manner but is arranged to drive the first lens group 1 and the shutter blades 3. The driving mechanism 4 and a barrier opening and closing mechanism 5 which is shown in a simplified manner are secured to a first lens group frame 6. A second lens group 7 is secured to a second lens group frame 8. The lens group frames 6 and 8 respectively have (normally) three cam pins 6-a and three cam pins 8-a. A rectilinear moving tube 11 which is arranged to guide the first and second lens group frames 6 and 8 only in the direction of an optical axis is secured to a camera body 9 in a manner which is not shown. In actuality, the rectilinear moving tube 11 has the above-stated cam pins 6-a and 8-a inserted through its slots which extend in the direction of the optical axis. A cam tube 10 is arranged on the outer circumferential side of the rectilinear moving tube 11 to be only rotatable around the optical axis. The cam tube 10 is rotated by the driving force of a motor M through a gear 10-a which is formed along the outer circumference of the cam tube 10. The cam tube 10 is provided with face inner concave cam grooves 10-b and 10-c which are arranged on the inner circumferential side of the cam tube 10 to guide the cam pins 6-a and 8-a for allowing the first and second lens groups 1 and 7 to move in an optically satisfactory manner. With the embodiment arranged in this manner, when the cam tube 10 is rotated by the motor M which serves as a drive source, the lens barrel is drawn out and moved along the optical axis from a barrel retracted (or stowed) position as shown in FIG. 1(a), to a wide-angle end position as shown in FIG. 1(b) and further to a telephoto end position as shown in FIG. 1(c), while varying a distance between the first lens group 1 and the second lens group 7.

A biasing spring 13 is formed by bending a wire material into a shape as shown in detail in FIGS. 4(a), 4(b) and 4(c), which respectively show the biasing spring 13 in a plan view, a front view and a side view. Referring to FIGS. 4(a), 4(b) and 4(c), the shape of the biasing spring 13 includes an approximately elliptic clip-like part 13-a which has a width C and a two-leg part 13-b. As shown in FIG. 4(a), the width C of the biasing spring 13 is arranged to be larger than one half of the width of the cam groove 10-b or 10-c. As shown in FIG. 4(b), the clip-like part 13-a and the leg part 13-b of the biasing spring 13 are formed at an angle of A degrees which is larger than 90 degrees between them. Further, as shown in FIG. 4(c), two ends 13-d of the clip-like part 13-a are bent at an angle of B degrees. The leg part 13-b also has a bent part 13-c.

Figure 3A:
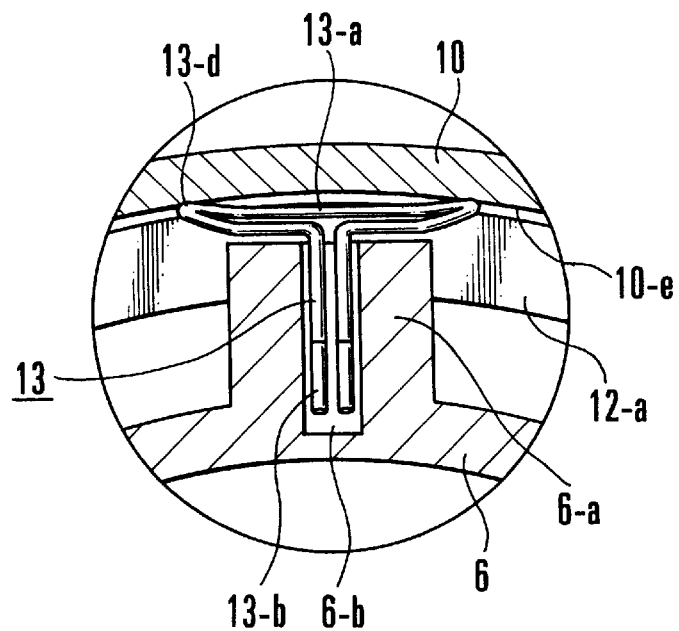
FIGS. 3(*a*) and 3(*b*) are enlarged views showing the first embodiment of this invention in a state obtained with a biasing spring used.
Figure 3B:
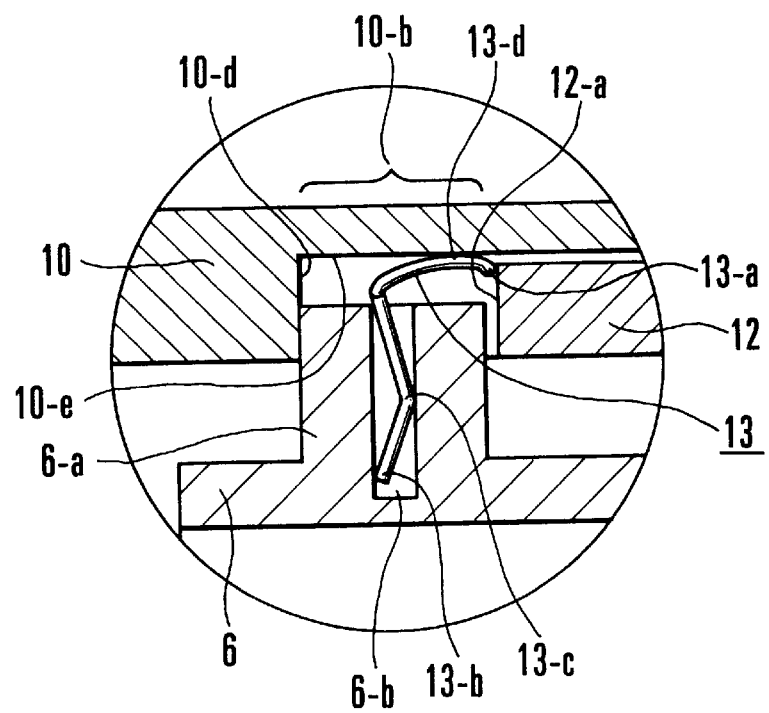
Figure 5:
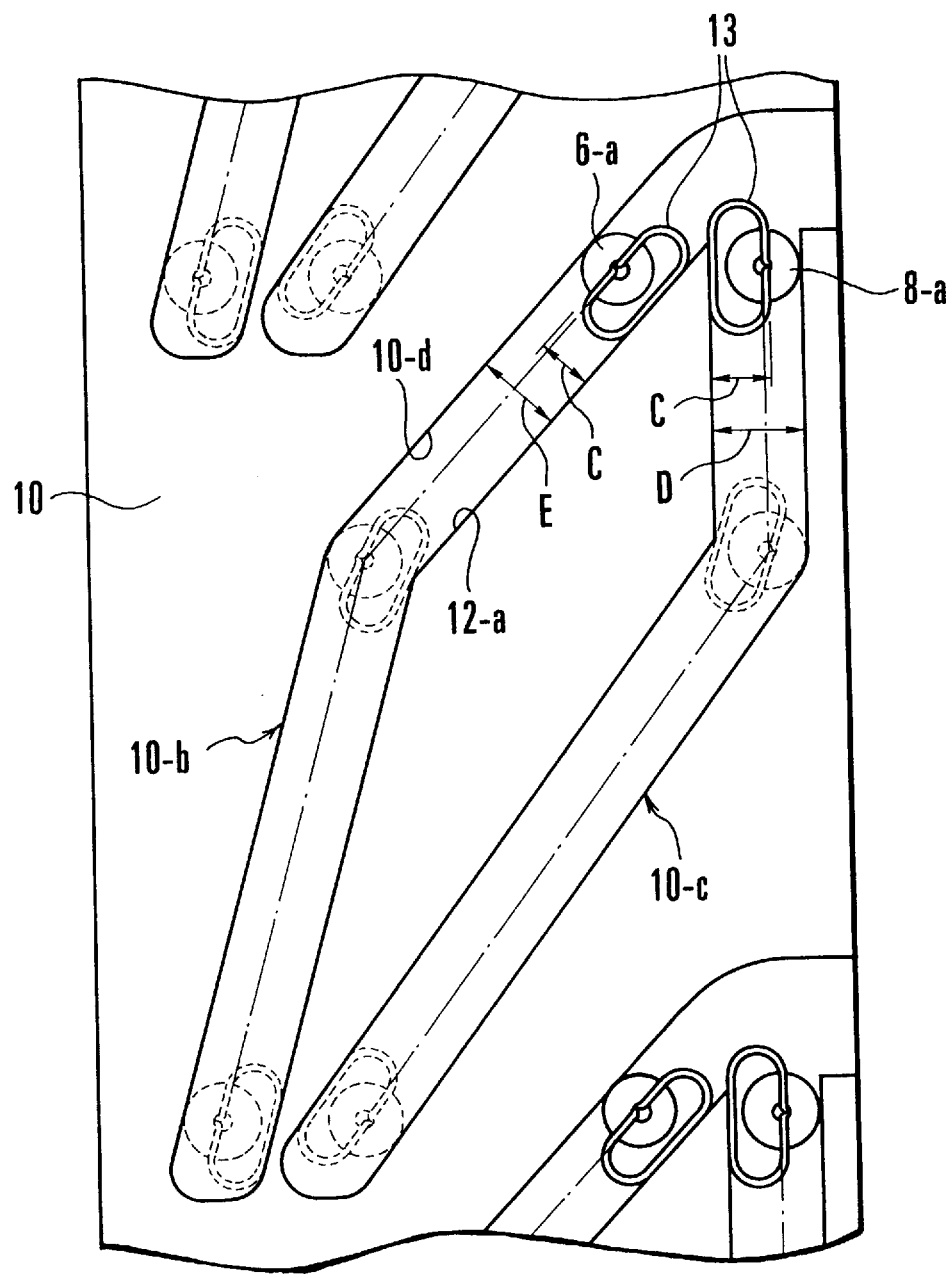
FIG. 5 is a development view showing a cam tube employed in the first embodiment of this invention.

The details of the cam pins 6-a and 8-a and the arrangement around them are described with reference to FIGS. 3(a) and 3(b) as follows: while these illustrations show only the arrangement of the first lens group frame 6, the second lens group frame 8 is arranged in the same manner, though it is not described here. The cam pin 6-a has a hole 6-b formed to extend along its axis. The leg part 13-b of the biasing spring 13 is inserted into the hole 6-b of the cam pin 6-a. To prevent the biasing spring 13 from easily pulling out from the cam pin hole 6-b, the bent part 13-c of the leg part 13-b is bent to an extent which is a little longer than the diameter of the cam pin hole 6-b. FIG. 5 is a development view showing the cam tube 10 in a state of having the biasing springs 13 inserted respectively into the cam grooves 10-b and 10-c. With the width C of the clip-like part 13-a of the biasing spring 13 arranged to be larger than one half of the width E or D of the cam groove 10-b or 10-c, the clip-like part 13-a of the biasing spring 13 is compressed by coming into contact with one cam face 12-a within the cam groove 10-b as shown in FIGS. 3(a) and 3(b). The cam pin 6-a thus can be caused to slide while being pushed constantly against the other cam face 10-d of the cam groove 10-b by the elastic force of the biasing spring 13.

The movement of the biasing spring 13 within the cam groove 10-b is apparent from FIG. 5. Even if the cam curve is in a complex shape, the biasing spring 13 rotates within the cam pin hole 6-b while following one face cam face 12-a, so that the cam pin 6-a can be caused to slide always over the other cam face 10-d. This arrangement thus allows the first lens group frame 6 to stably move along the cam groove 10-b in accordance with the cam curve defined by the cam groove 10-b.

Figure 6A:
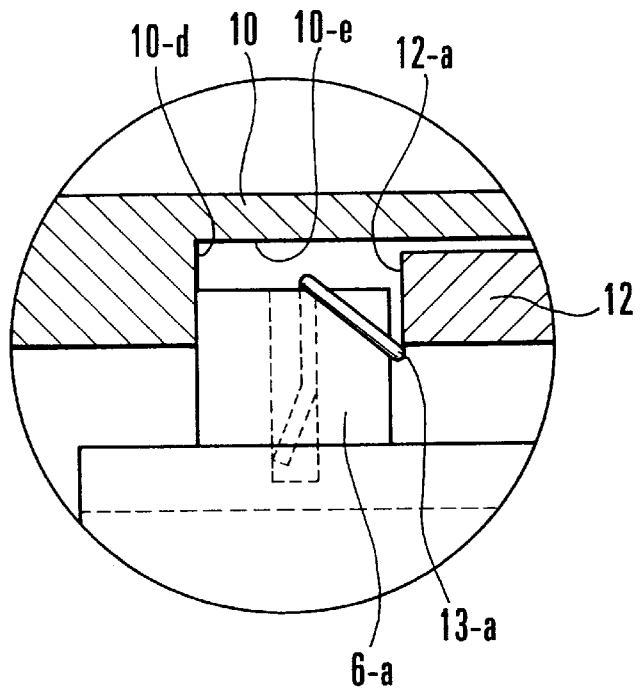
FIGS. 6(*a*) and 6(*b*) show the action of the biasing spring of the first embodiment of this invention.
Figure 6B:
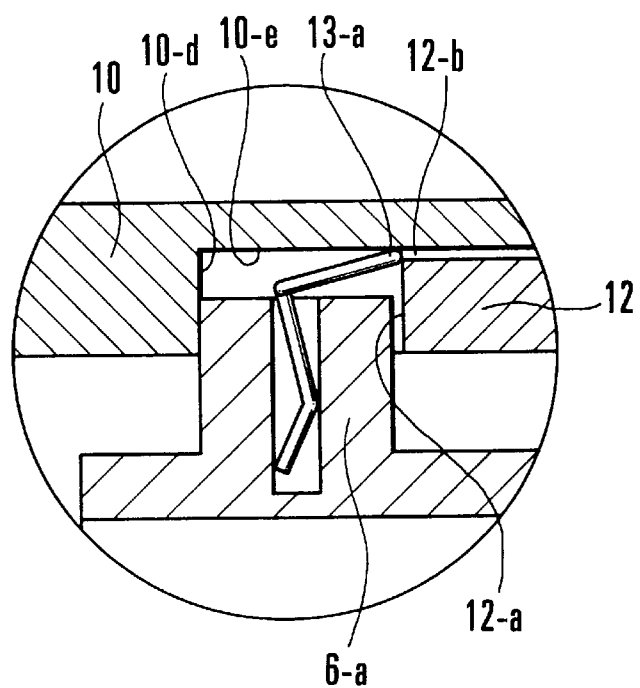

Referring to FIGS. 6(a) and 6(b), the angles A and B of the biasing spring 13 are described as follows:

Angle A:

When the clip-like part 13-a of the biasing spring 13 is charged by the one cam face 12-a, the clip-like part 13-a might jump out from the inner face of the cam tube 10 as shown in FIG. 6(a). To prevent this, the clip-like part 13-a and the leg part 13-b are arranged to have the angle of A degrees which is larger than 90 degrees, so that the clip-like part 13-a can be kept abutting on the bottom face 10-e of the inner cam groove 10-b. This angle of A degrees is thus arranged to be charged by the cam groove bottom face 10-e, so that the clip-like part 13-a can be prevented from jumping out to the inner face of the cam tube 10.

Angle B:

Generally, in making the cam face of a cam groove into a face cam, the cam face is formed by cutting of metal or plastic or by joining at least two molded plastic parts into a face cam groove. While a face cam groove obtained by cutting presents no problem, a face cam groove obtained by joining two or more parts together might make a normal action hardly possible by causing the clip-like part 13-a of the biasing spring 13 to bite and stick to a gap 12-b between the first cam tube 10 and the second cam tube 12 as shown in FIG. 6(b). To prevent this trouble, both ends of the clip-like part 13-a are bent at the angle of B degrees as shown in FIG. 4(c). The provision of the angle B effectively prevents the clip-like part 13-a from sticking to the gap 12-b by allowing the biasing spring 13 to be always in contact with the cam face 12-a at the middle part of the clip-like part 13-a and to abut on the bottom face 10-e of the cam groove 10-b only at the two ends 13-d of the clip-like part 13-a as shown in FIGS. 3(a) and 3(b).

In the case of this embodiment, the biasing spring 13 which is made of a wire material is employed as a biasing member. However, the same function can be likewise accomplished by using, for example, a plastic or sheet metal material instead of the wire material.

Figure 8:
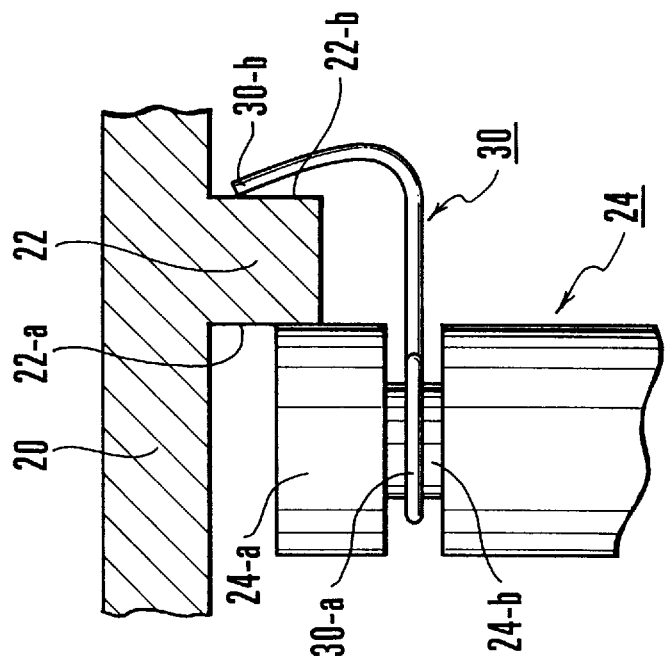
FIG. 8 a partial sectional view showing the biasing spring of the second embodiment of this invention in a state of being in use.
Figure 7:
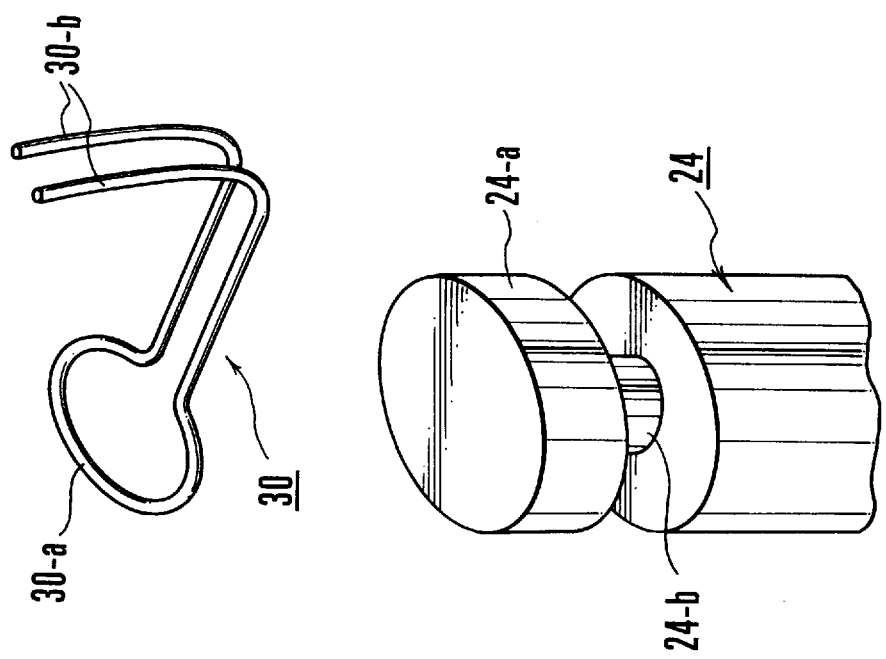
FIG. 7 is an exploded oblique view showing a biasing spring and a cam pin used for a second embodiment of this invention.

Next, a second embodiment of this invention is described with reference to FIGS. 7 and 8 as follows:

In the case of the second embodiment, a protruding convex cam 22 is formed on the inner circumferential face of a cam tube 20. A cam pin 24 serving as a cam follower is provided with a cam follower part 24-a which is arranged to slide over one cam face 22-a of the protruding cam 22. The cam pin 24 has a small diameter part 24-b. A biasing spring 30 has an approximately circular base part 30-a, which is rotatably fitted on the small diameter part 24-b of the cam pin 24. In actuality, the circular base part 30-*a* of the biasing spring 30 is spread in fitting it on the small diameter part 24-*b*. The biasing spring 30 has two contact parts 30*b* thereof in contact with the other cam face 22-*b* of the protruding cam 22 and is arranged to generate an elastic force in such a way as to constantly press the cam follower part 24-*a* of the cam pin 24 against the cam face 22-*a*. Further, since the biasing spring 30 is carried in such a way as to be rotatable on the cam pin 24, the biasing spring 30 enables the cam follower part 24-*a* to slide over the cam face 22-*a* always at apposite pressure by rotating according to any cam displacement, in whatever manner the cam displacement may be arranged.

Figure 9:
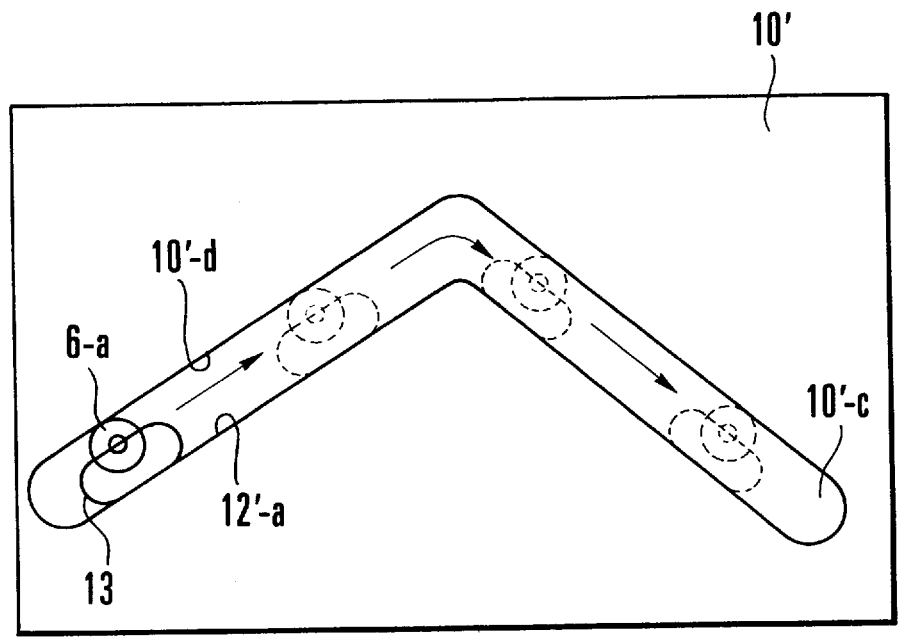
FIG. 9 shows the locus of movement of a cam pin used for a third embodiment of this invention.

A third embodiment of this invention is described with reference to FIGS. 9 and 10 as follows:

FIG. 9 shows the third embodiment, in which the cam displacement of the cam groove of the first embodiment is changed. With the exception of this change, the rest of the third embodiment is arranged in the same manner as the first embodiment. In the third embodiment, a cam tube 10' has a cam groove 10'-*c* which is arranged to make cam displacement in a hairpin-like manner. The biasing spring 13 can be arranged to cause the cam pin 6-*a* to slide always over one cam face 10'-*d* of the cam groove 10'-*c*.

Figure 10:
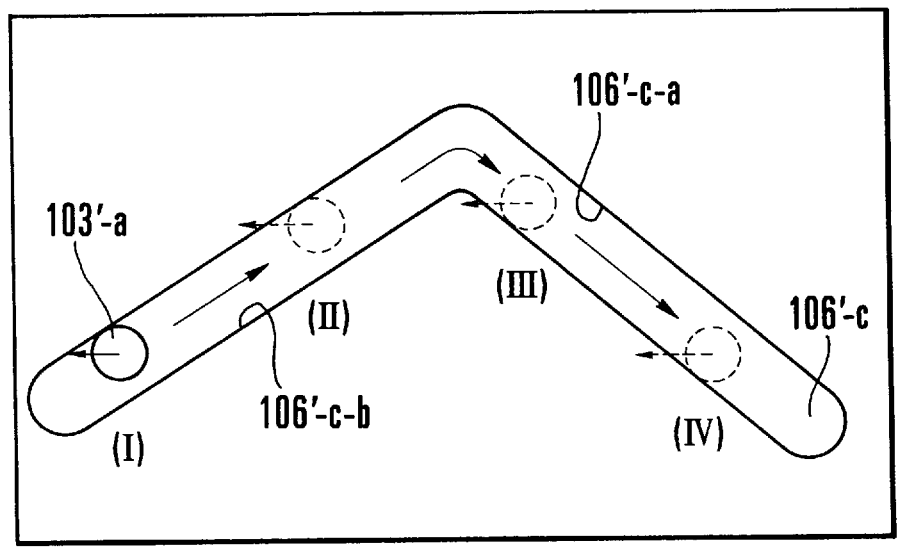
FIG. 10 shows the locus of movement of a cam pin used for the conventional camera.
Figure 17A:
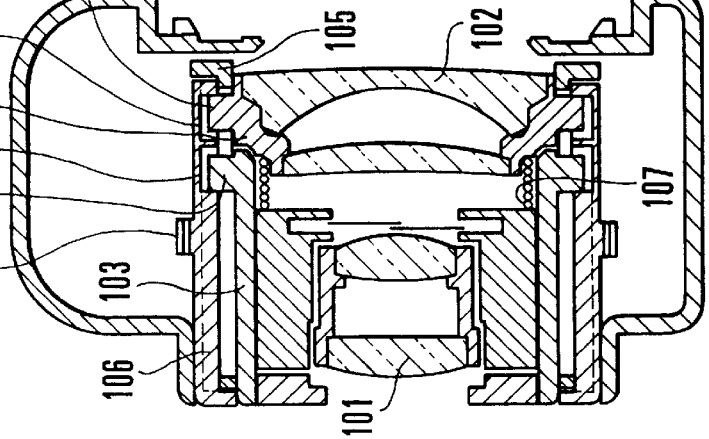
FIGS. 17(*a*), 17(*b*) and 17(*c*) are sectional views showing essential parts of the conventional arrangement in a state obtained with an inter-lens spring used.
Figure 17B:
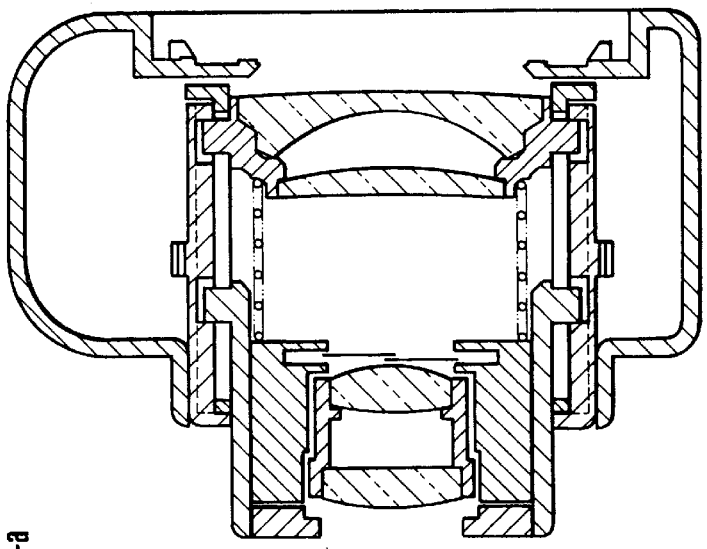
Figure 17C:
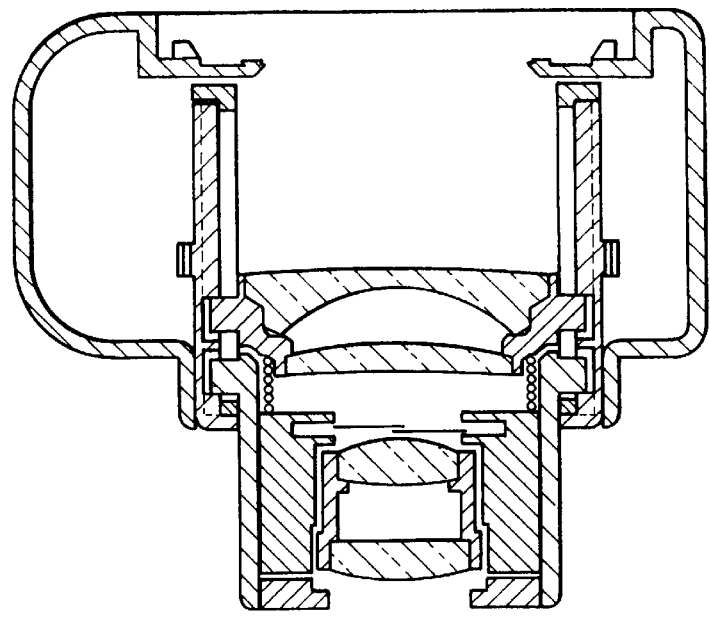
Figure 18:
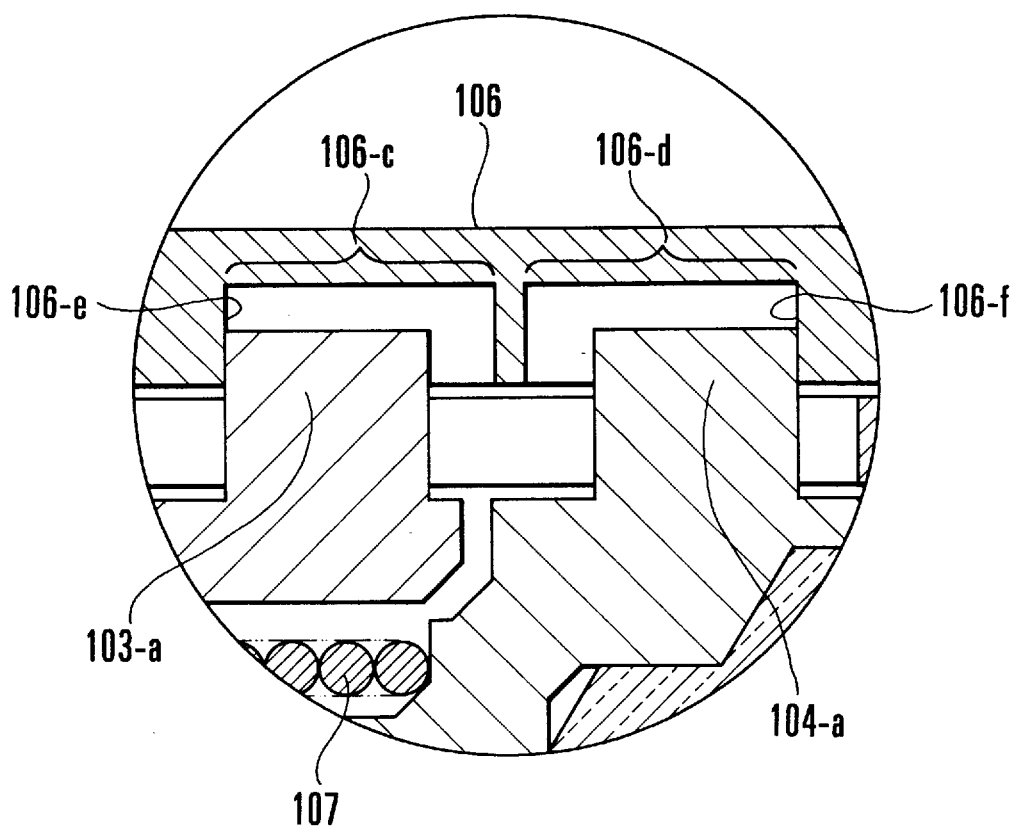
FIG. 18 is an enlarged view showing in part the arrangement shown in FIGS. 17(*a*), 17(*b*) and 17(*c*).
Figure 19:
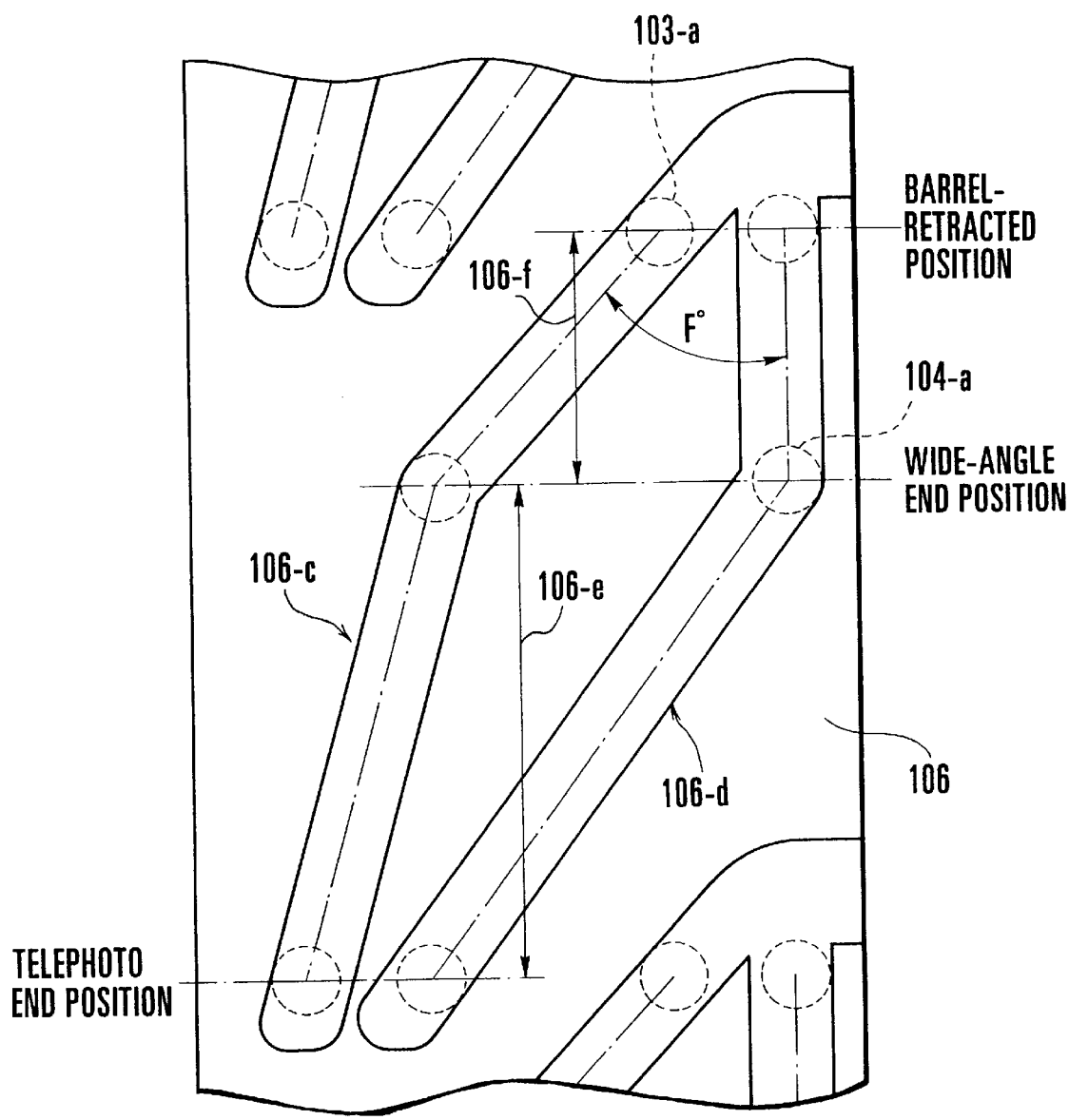
FIG. 19 is a development view showing a cam tube shown in FIGS. 17(*a*), 17(*b*) and 17(*c*).
Figure 20:
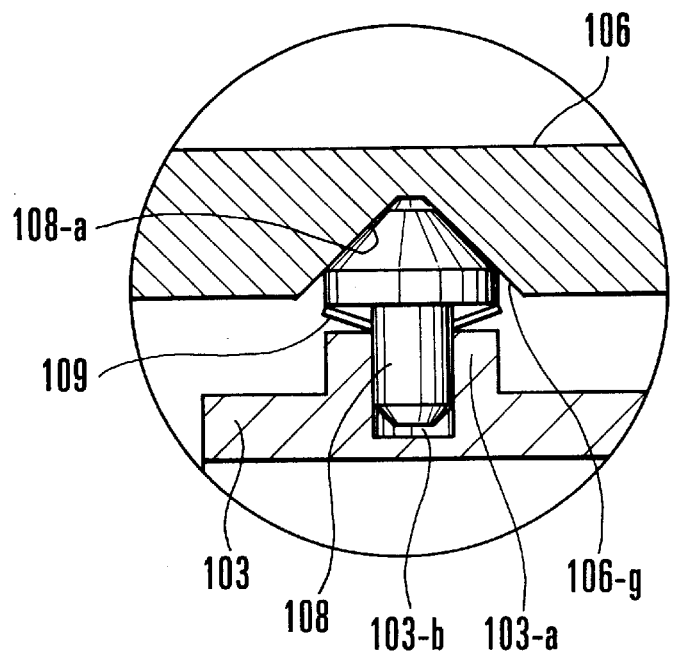
FIG. 20 is a partial sectional view showing a state obtained with the conventional taper pin employed.
Figure 21:
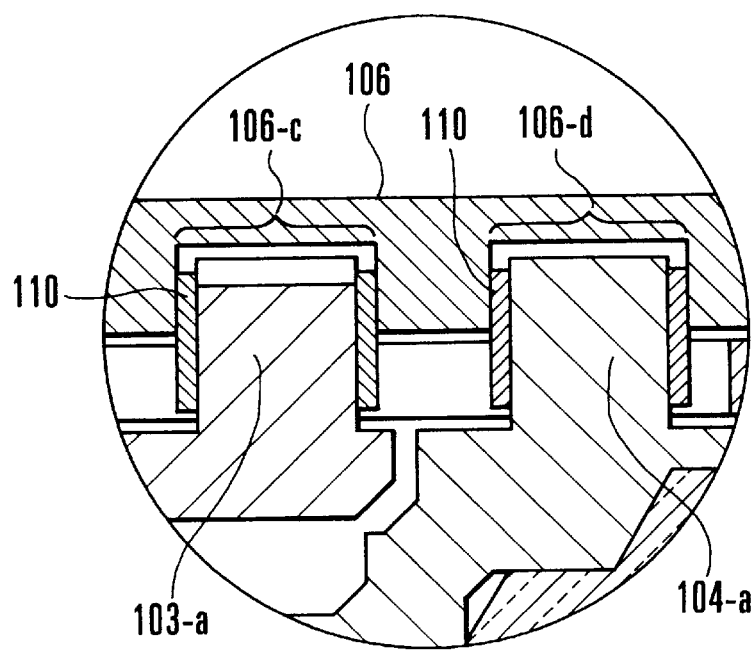
FIG. 21 shows the conventional method of using a synthetic resin material for removal of a play.
Figure 22:
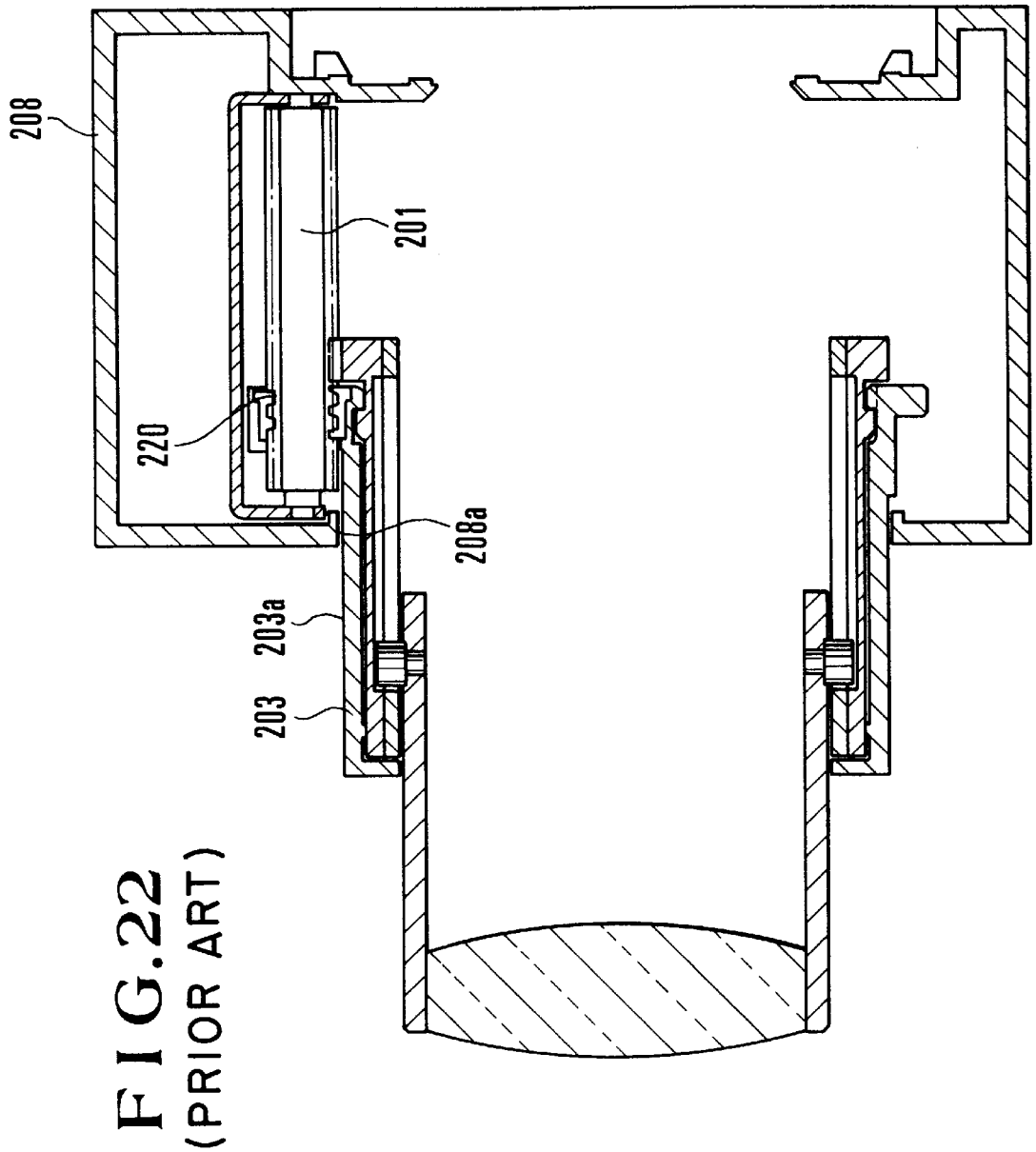
FIG. 22 is a sectional view showing the conventional camera having a zoom mechanism in a telephoto position.
Figure 23:
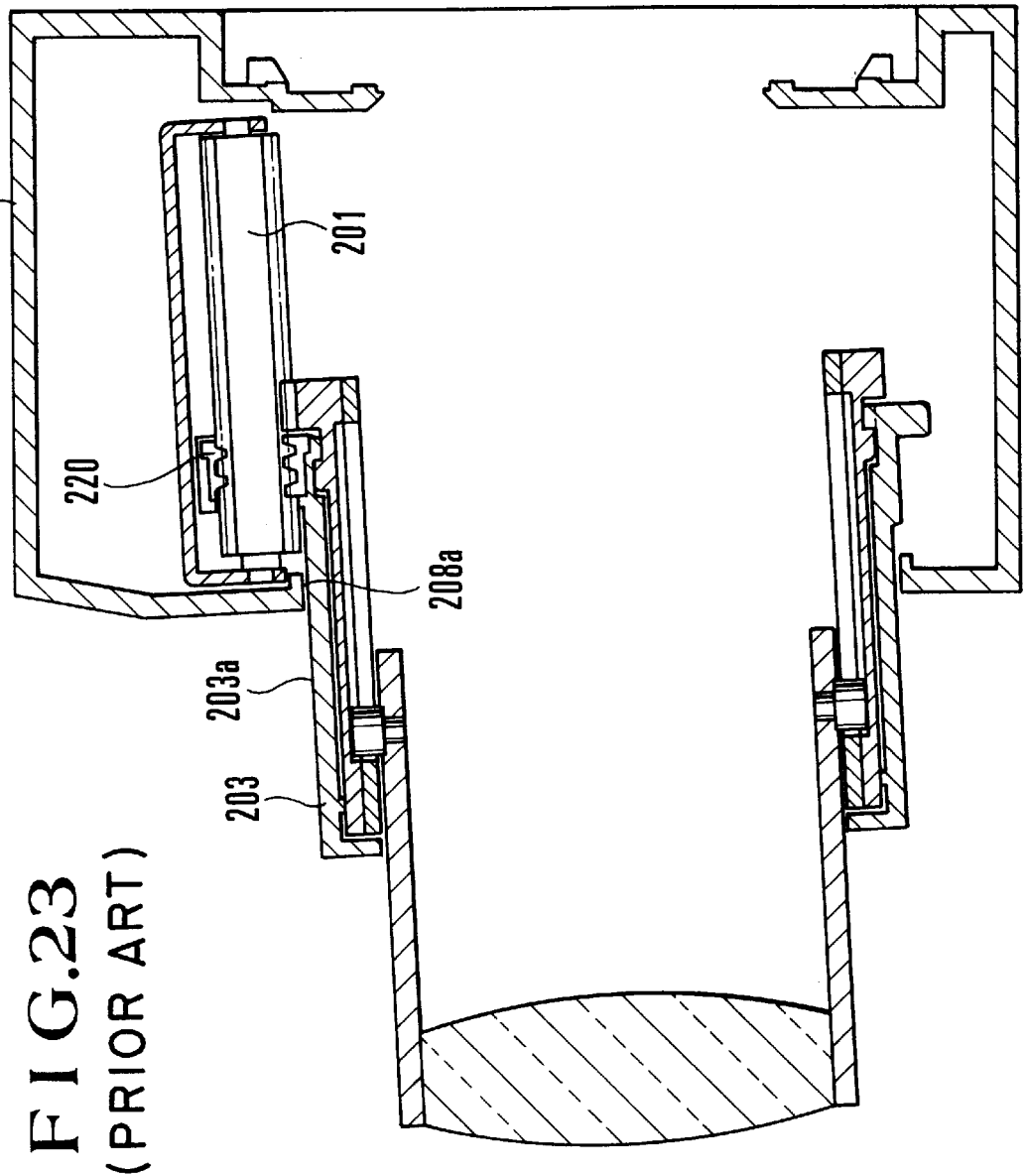
FIG. 23 is a sectional view showing the same conventional camera in a state of having its lens barrel bent by an external force exerted from above.

In the case of the conventional arrangement shown in FIGS. 17(*a*), 17(*b*) and 17(*c*), if a biasing spring force is applied to a cam pin 103'-*a* in the direction of arrow as shown in FIG. 10, the cam pin 103'-*a* slides over one cam face 106'-*c*-*a* at positions (I) and (II). However, at positions (III) and (IV), the cam pin 103'-*a* comes to slide over the other cam face 106'-*c*-*b*. In accordance with the conventional arrangement, therefore, the movement of an optical member cannot be accurately controlled.

Further, in each of the embodiments described, one of the cam faces over which the cam pin is sliding as a cam follower is arranged to have the same cam displacement as the other cam face which is kept in contact with the biasing spring employed as a biasing member. However, the cam displacement of the latter cam face may be arranged to differ from that of the former cam face as the latter does not have to have a high degree of precision.

In the case of each of the embodiments described with reference to FIGS. 1(*a*) to 9, the biasing member which is turnable on the cam follower is used for causing the cam follower to slide always over one of the cam faces. Therefore, the movement of the optical member can be accurately controlled for any cam displacement. A load to be caused by the biasing action can be arranged to be less than a load conventionally imposed. Further, the arrangement according to this invention permits reduction in space and the number of necessary parts.

Figure 11:
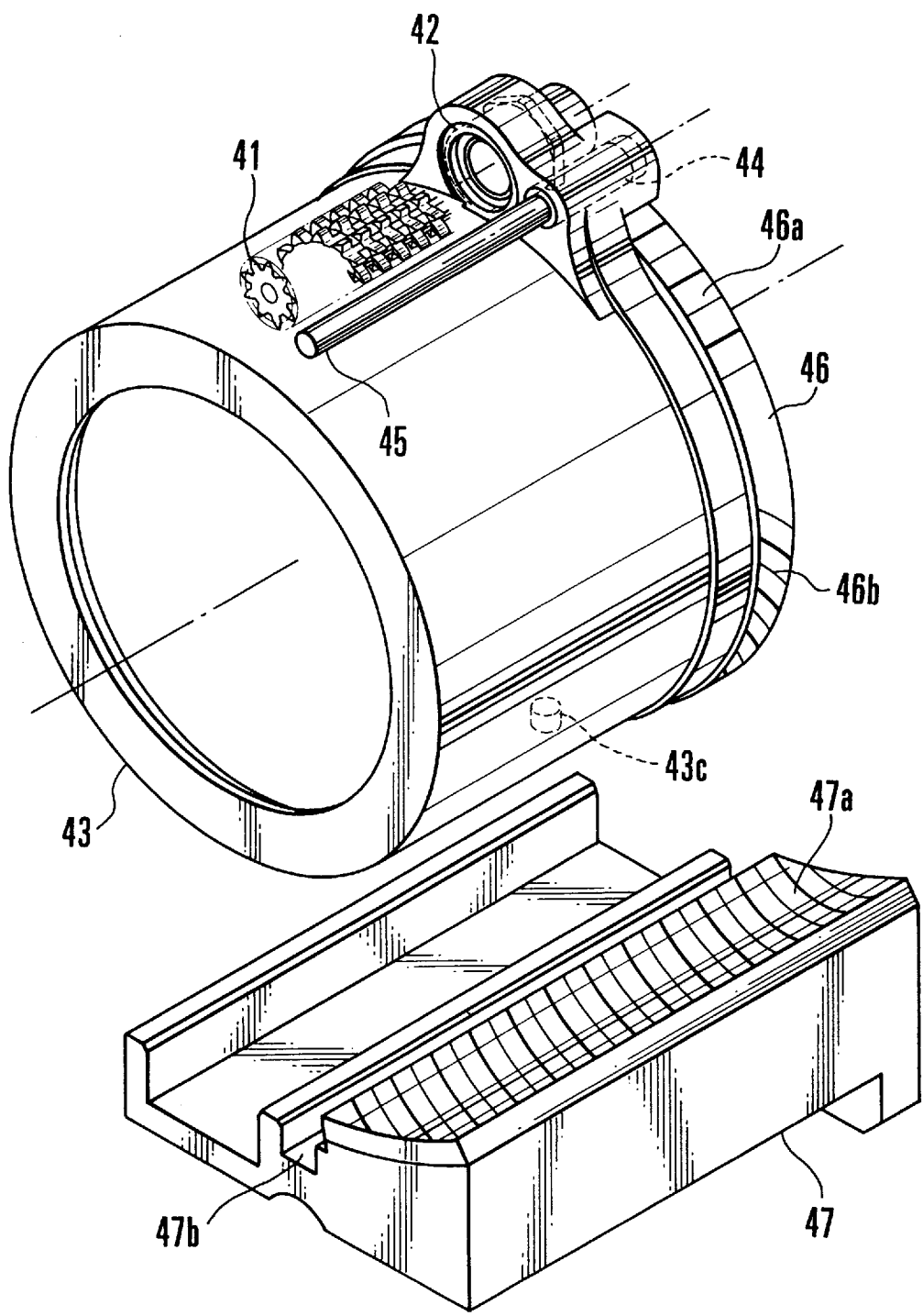
FIG. 11 is an oblique view showing the essential parts of an optical apparatus arranged as a fourth embodiment of this invention.
Figure 12:
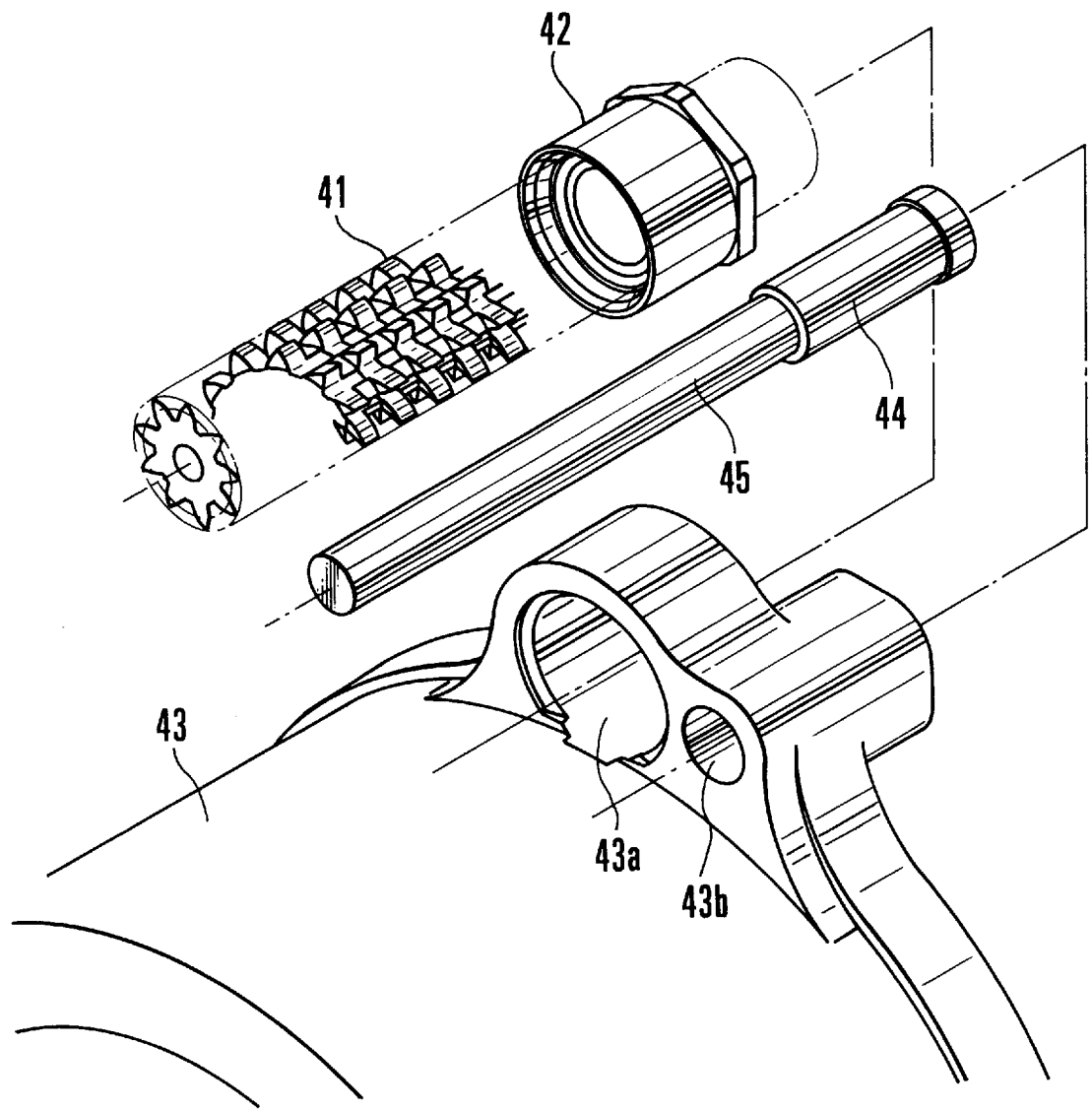
FIG. 12 is an enlarged, exploded oblique view showing some of the essential parts shown in FIG. 11.
Figure 13:
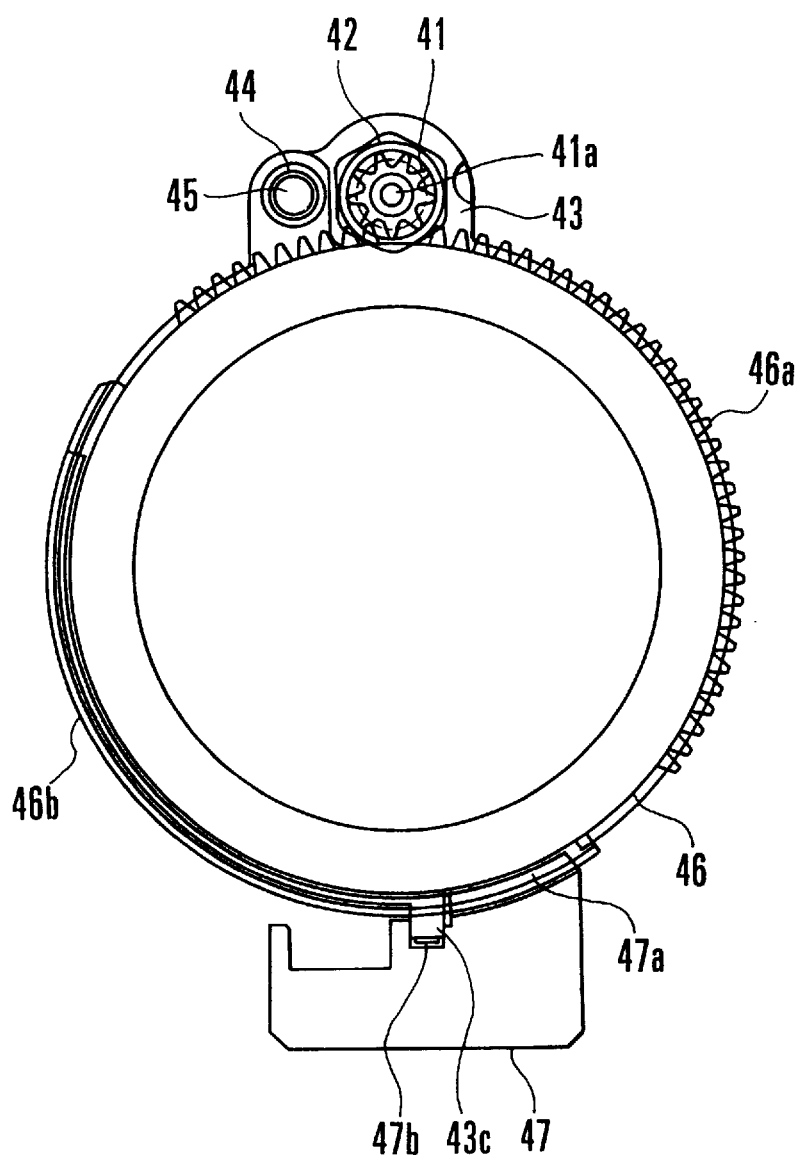
FIG. 13 is a sectional view of the optical apparatus shown in FIG. 11.
Figure 14:
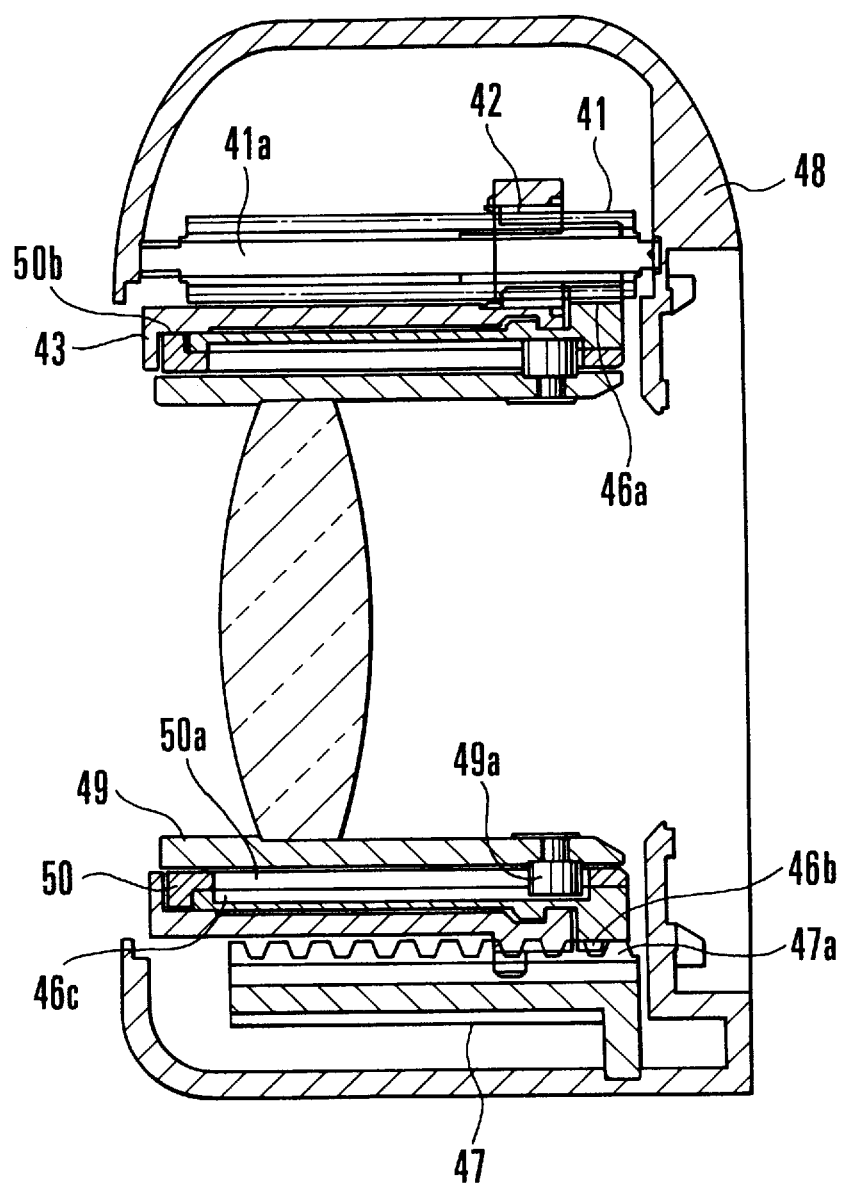
FIG. 14 is a sectional view showing the action of a camera having a zoom mechanism to which the arrangement of FIG. 11 is applied.
Figure 15:
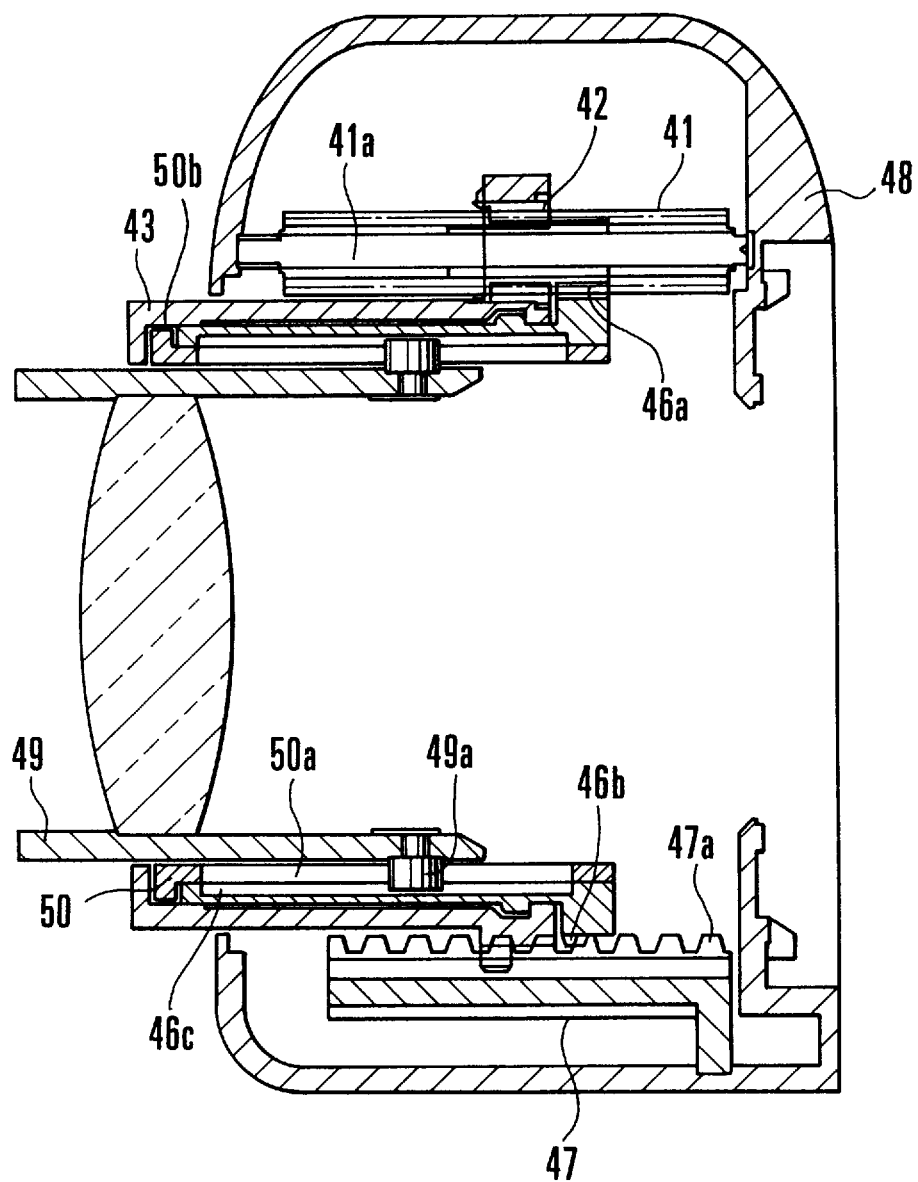
FIG. 15 is a sectional view showing the action of the camera having the zoom mechanism to which the arrangement of FIG. 11 is applied.
Figure 16:
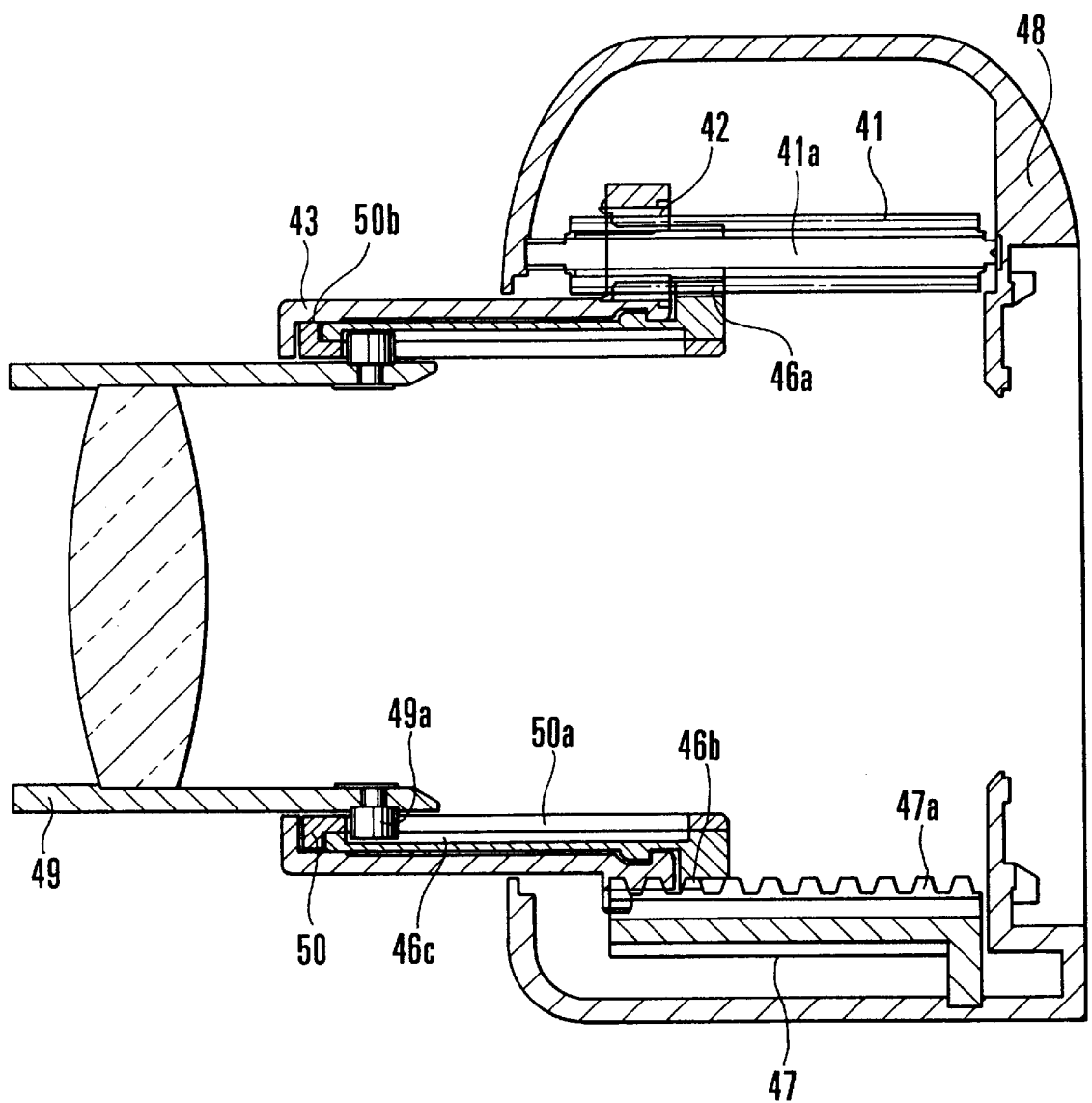
FIG. 16 is a sectional view showing the action of the camera having the zoom mechanism to which the arrangement of FIG. 11 is applied.

FIG. 11 shows in an oblique view the essential parts of the mechanism of a fourth embodiment of this invention. FIG. 12 is an enlarged oblique view showing a part of FIG. 11. FIG. 13 is a sectional view, taken perpendicular to an optical axis, showing the essential parts of the mechanism shown in FIG. 11. FIGS. 14, 15 and 16 show the action of a camera having a lens barrel retracting mechanism to which the arrangement of FIG. 11 is applied. The fourth embodiment is described with reference to FIGS. 11 to 16 as follows:

The camera of the fourth embodiment is arranged to draw out a lens barrel 43 which serves as a frame body from a camera body 48 and then to further draw out a lens frame 49 with respect to the lens barrel 43. A spur-gear helicoid 41 is employed as a driving force transmitting part of a driving mechanism arranged to draw out the lens barrel 43. As viewed on a section taken perpendicular to its axis 41*a* the spur-gear helicoid 41 is a long rod-like spur gear and has a helicoid male thread gear formed in such a manner as to spatially overlap its spur gear. The actual shape of the spur-gear helicoid 41 is shown only in part in FIGS. 11 and 12. A helicoid bush 42 which has a helicoid female thread formed therein to engage the male thread part of the spur-gear helicoid 41 is secured to a hole 43*a* which is provided on a peripheral part of the lens barrel 43 as shown in FIG. 12. Further, a fit engagement bush 44 is secured to a hole 43*b* of the lens barrel 43 as shown in FIG. 12. A fit engagement bar 45 which is slidably fitted into the fit engagement bush 44 and the spur-gear helioid 41 which is fitted into the helicoid bush 42 in such a way as to be movable back and forth by rotation are respectively hung at their both ends by a member which is not shown. They are thus carried by the camera body 48 in a rotatable state. The lens barrel 43 is provided with a projection 43*c* which is located on a side approximately opposite to the holes 43*a* and 43*b* of the lens barrel 43. The projection 43*c* is fitted in a rail groove 47*b* provided in a guide member 47 in such a way as to be movable in the direction of the optical axis. This arrangement enables the lens barrel 43 to move back or forth in the direction of the optical axis as the spur-gear helicoid 41 is rotated forward or backward by a drive source such as a motor or the like.

As shown, a cam ring 46 which is a rotary member is rotatably fitted on the lens barrel 43 in its inside diameter position. The cam ring 46 is allowed to engage the lens barrel 43 by a bayonet mechanism and is arranged to be rotatable, except a part of a rotation angle range (necessary for mounting), relative to the lens barrel 43 without moving in the direction of the optical axis. The cam ring 46 is thus arranged to move along with the movement of the lens barrel 43 in the direction of the optical axis. Further, on the outer circumference of the cam ring 46, there are formed a spur gear 46*a* which is of the same module as that of the spur gear of the spur-gear helicoid 41 and a helicoid male thread gear 46*b* which is located on a side approximately opposite to the spur gear 46*a* across the optical axis. Since the spur gear 46*a* is arranged to engage the spur gear of the spur-gear helicoid 41, the forward or backward rotation of the spur-gear helicoid 41 causes the cam ring 46 to rotate backward or forward. Further, the helicoid male thread gear 46*b* is arranged to intermesh with the helicoid female gear 47*a* of the guide member 47. Therefore, when the lens barrel 43 is caused by the rotation of the cam ring 46 to move forward or backward in the direction of the optical axis as shown in FIGS. 14, 15 and 16, the helicoid male thread gear 46*b* moves in a state of intermeshing with the helicoid female thread gear 47*a* of the guide member 47. The lead of the helicoid female thread gear 47*a* is arranged to coincide with the lead of the cam ring 46 obtained when the lens barrel 43 is drawn out by the spur-gear helicoid 41 and can be expressed as follows:

$$L47 = \frac{L41 \times Z46}{Z41}$$

wherein
L41: the lead of the spur-gear helicoid 41
L47: the lead of the helicoid female thread gear 47*a* of the guide member 47 or the lead of the helicoid male thread gear 46*b* of the cam ring 46
Z41: the number of teeth of the spur-gear helicoid 41
Z46: the number of teeth of the cam ring 46

The above-stated mechanisms enable the cam ring 46 to move, while rotating, back and forth together with the lens barrel 43. In this case, cam pins 49a which are planted in a lens frame 49 are inserted into cam grooves 46c formed in the cam ring 46 and slots 50a formed in a rectilinear moving tube 50. The lens frame 49 is thus arranged to move back and forth in the direction of the optical axis when the cam ring 46 rotates. Further, the lens barrel 43 is shown in a barrel retracted position in FIG. 14, in a wide-angle end position in FIG. 15 and in a telephoto end position in FIG. 16.

The guide member 47 is disposed in a position nearly opposite, across the optical axis, to the spur-gear helicoid 41 which is provided for moving the lens barrel 43 in the direction of the optical axis. The guide member 47 is provided with the helicoid female thread gear 47a which is arranged to intermesh with the helicoid male thread gear 46b of the cam ring 46. Therefore, even an external force such as a static pressure, shaking or collision is applied to the lens barrel 43, the external force is dispersed by virtue of the two helicoids, so that the external force can be received in a well balanced manner. Unlike the example of conventional arrangement described in the foregoing, this arrangement thus effectively prevents the lens barrel 43 from being bent by the external force. In addition to that, the use of the helicoids for transmission of the driving force of the driving mechanism further enhances the effective dispersion of the external force.

In the case of the fourth embodiment described above, the driving force transmitting part for transmitting the driving force of the driving mechanism is disposed on the outer circumferential side of the lens barrel 43. However, the driving force transmitting part may be arranged on the inner circumferential side of the lens barrel 43 by arranging the helicoid part of the guide member 47 to be in mesh with a helicoid part on the inner circumferential side of the cam ring 46. Further, the lens barrel driving mechanism may be changed to replace the spur-gear helicoid 41 with some other suitable means.

As mentioned above, the fourth embodiment shown in FIGS. 11 to 16 is arranged to have any external force on the frame, such as a static pressure, shaking or collision, dispersed through intermeshing of helicoids which are disposed nearly symmetrically, across the optical axis, with the driving force transmitting part arranged to transmit the driving force of the driving mechanism, so that the external force can be received in a well balanced manner. Therefore, the arrangement gives an optical apparatus which is strong against external forces.

Further, the use of the helicoids as a driving force transmitting part for transmitting the driving force of the driving mechanism makes the dispersion of an external force more effective.

What is claimed is:

1. An optical device, comprising:
   (A) an optical unit,
   (B) a concave cam,
   (C) a cam-follower for guiding the optical unit along the concave cam, and
   (D) an elastic member for urging the cam-follower to one surface of the concave cam while the elastic member rests against another surface of the concave cam.

2. An optical device according to claim 1, wherein the cam-follower movably supports the elastic member.

3. An optical device according to claim 1, wherein the cam-follower rotatably supports the elastic member.

4. An optical device according to claim 1, wherein the cam-follower swingably supports the elastic member.

5. An optical device according to claim 1, wherein the elastic member is arranged to urge the cam-follower from a direction vertical to the another surface of the concave cam even when an inclination of the another surface of the concave cam changes.

6. An optical device according to claim 1, wherein the concave cam is arranged to guide the optical unit so as to change a focal length.

7. An optical device according to claim 6, wherein the concave cam is arranged to guide the optical unit into a retracted position.

8. An optical device according to claim 1, wherein the concave cam is arranged to guide the optical unit into a retracted position.

9. An optical device according to claim 1, wherein the concave cam is arranged to guide a shutter together with the optical unit.

10. An optical device according to claim 1, wherein the optical device includes a camera.

11. An optical device according to claim 1, wherein the optical device includes a lens barrel.

12. An optical device according to claim 1, wherein the optical unit includes a lens.

13. An optical deice according to claim 1, wherein the elastic member includes a spring.

14. A cam device, comprising:
   (A) a concave cam,
   (B) a cam-follower for guiding an operation unit along the concave cam, and
   (C) an elastic member which urges the cam-follower to one surface of the concave cam while the elastic member rests against another surface of the concave cam.

15. A cam device according to claim 14, wherein the cam-follower movably supports the elastic member.

16. A cam device according to claim 15, wherein the cam-follower rotatably supports the elastic member.

17. A cam device according to claim 14, wherein the cam-follower swingably supports the elastic member.

18. A cam device according to claim 14, wherein the elastic member is arranged to urge the cam-follower from a direction vertical to the another surface of the concave cam even when an inclination of the another surface of the concave cam changes.

19. A cam device according to claim 14, wherein the concave cam is arranged to an optical unit as the operation unit so as to change a focal length.

20. A cam device according to claim 19, wherein the concave cam is arranged to guide the optical unit as the operation unit into a retracted position.

21. A cam device according to claim 14, wherein the concave cam is arranged to guide the optical unit as the operation unit into a retracted position.

22. A cam device according to claim 14, wherein the concave cam is arranged to guide the optical unit as the operation unit and a shutter.

23. A cam device according to claim 14, wherein the operation unit includes a lens.

24. A cam device according to claim 14, wherein the elastic member includes a spring.

25. An optical device, comprising:
   (A) an optical unit,
   (B) a convex cam,
   (C) a cam-follower for guiding the optical unit along the convex cam, and
   (D) an elastic member for urging the cam-follower to one surface of the convex cam while the elastic member rests against another surface of the convex cam.

26. An optical device according to claim 25, wherein the cam-follower movably supports the elastic member.

27. An optical device according to claim 25, wherein the cam-follower rotatably supports the elastic member.

28. An optical device according to claim 25, wherein the cam-follower swingably supports the elastic member.

29. An optical device according to claim 25, wherein the elastic member is arranged to urge the cam-follower from a direction vertical to the another surface of the convex cam even when an inclination of the another surface of the convex cam changes.

30. An optical device according to claim 25, wherein the convex cam is arranged to guide the optical unit so as to change a focal length.

31. An optical device according to claim 30, wherein the convex cam is arranged to guide the optical unit into a retracted position.

32. An optical device according to claim 25, wherein the convex cam is arranged to guide the optical unit into a retracted position.

33. An optical device according to claim 25, wherein the convex cam is arranged to guide a shutter together with the optical unit.

34. An optical device according to claim 25, wherein the optical device includes a camera.

35. An optical device according to claim 25, wherein the optical device includes a lens barrel.

36. An optical device according to claim 25, wherein the optical unit includes a lens.

37. An optical device according to claim 25, wherein the elastic member includes a spring.

38. A cam device, comprising:

(A) a convex cam, (B) a cam-follower for guiding an operation unit along the convex cam, and (C) an elastic member which urges the cam-follower to one surface of the convex cam while the elastic member rests against another surface of the convex cam.

39. A cam device according to claim 38, wherein the cam-follower movably supports the elastic member.

40. A cam device according to claim 38, wherein the cam-follower rotatably supports the elastic member.

41. A cam device according to claim 38, wherein the cam-follower swingably supports the elastic member.

42. A cam device according to claim 38, wherein the elastic member is arranged to urge the cam-follower from a direction vertical to the another surface of the convex cam even when an inclination of the another surface of the concave cam changes.

43. A cam device according to claim 38, wherein the convex cam is arranged to an optical unit as the operation unit so as to change a focal length.

44. A cam device according to claim 43, wherein the convex cam is arranged to guide the optical unit as the operation unit into a retracted position.

45. A cam device according to claim 38, wherein the convex cam is arranged to guide the optical unit as the operation unit into a retracted position.

46. A cam device according to claim 38, wherein the convex cam is arranged to guide the optical unit as the operation unit and a shutter.

47. A cam device according to claim 38, wherein the operation unit includes a lens.

48. A cam device according to claim 38, wherein the elastic member includes a spring.

* * * * *

UNITED STATES PATENT AND TRADEMARK OFFICE
CERTIFICATE OF CORRECTION

PATENT NO. : 5,805,353
DATED : September 8, 1998
INVENTOR(S) : Kazushige Ichino, et al.

It is certified that error appears in the above-identified patent and that said Letters Patent is hereby corrected as shown below:

Column 10, line 34, delete "15" and insert --14--.

Signed and Sealed this

Ninth Day of February, 1999

Attest:

Attesting Officer

Acting Commissioner of Patents and Trademarks